(12) United States Patent
Jiang et al.

(10) Patent No.: US 9,920,790 B2
(45) Date of Patent: Mar. 20, 2018

(54) ACTIVE AIRBEARING DEVICE

(71) Applicant: HUAZHONG UNIVERSITY OF SCIENCE AND TECHNOLOGY, Wuhan, Hubei (CN)

(72) Inventors: Wei Jiang, Hubei (CN); Xuedong Chen, Hubei (CN); Xin Luo, Hubei (CN); Lizhan Zeng, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/126,537

(22) PCT Filed: Apr. 2, 2014

(86) PCT No.: PCT/CN2014/074642
§ 371 (c)(1),
(2) Date: Sep. 15, 2016

(87) PCT Pub. No.: WO2015/139340
PCT Pub. Date: Sep. 24, 2015

(65) Prior Publication Data
US 2017/0082144 A1    Mar. 23, 2017

(30) Foreign Application Priority Data
Mar. 18, 2014  (CN) .......................... 2014 1 0100961

(51) Int. Cl.
*F16C 32/06*  (2006.01)
*F16C 29/00*  (2006.01)

(52) U.S. Cl.
CPC .......... *F16C 32/0607* (2013.01); *F16C 29/00* (2013.01); *F16C 32/067* (2013.01);
(Continued)

(58) Field of Classification Search
CPC .............. F16C 32/0603; F16C 32/0607; F16C 32/0622; F16C 32/0625; F16C 2233/00; F16C 2322/39; F16C 32/0614
See application file for complete search history.

(56) References Cited

U.S. PATENT DOCUMENTS

| | | | |
|---|---|---|---|
| 3,313,139 A | 4/1967 | Caumartin et al. | |
| 4,809,354 A | 2/1989 | Kawashima | |

(Continued)

FOREIGN PATENT DOCUMENTS

| | | |
|---|---|---|
| CN | 101225853 | 7/2008 |
| CN | 101319692 | 12/2008 |

(Continued)

OTHER PUBLICATIONS

International Search Report for international application No. PCT/CN2014/074642, dated Dec. 10, 2014 (4 pages, including English translation).

(Continued)

*Primary Examiner* — Phillip A Johnson
(74) *Attorney, Agent, or Firm* — Hamre, Schumann, Mueller & Larson, P.C.

(57) ABSTRACT

The present invention discloses an active airbearing device, including a airbearing body, a gas film active adjusting unit, a support body detection unit and a drive control unit, wherein the support body detection device measures a state of airbearing, the drive control system generates a control signal according to a detection signal, drives and controls the gas film active adjusting device to generate an active action, and dynamically adjusts the form of gas films on a airbearing surface, so as to dynamically adjust pressure distribution of gaps between the gas films of the airbearing device, thereby improving dynamic stiffness characteristics of the airbearing. Through the present invention, the dynamic stiffness characteristics of the airbearing can be improved signifi- (Continued)

cantly, and the purpose of stabilizing the airbearing is achieved; in addition, the active airbearing device according to the present invention also has the characteristics of a compact structure, convenient operation and control, and high precision, and thus is especially suitable for occasions such as ultra-precision machining or high speed spindle which has high requirements for dynamic stiffness of support.

3 Claims, 1 Drawing Sheet

(52) U.S. Cl.
CPC ...... *F16C 32/0614* (2013.01); *F16C 2233/00* (2013.01); *F16C 2322/39* (2013.01)

(56) References Cited

U.S. PATENT DOCUMENTS

| | | | |
|---|---|---|---|
| 5,238,308 A | 8/1993 | Lang et al. | |
| 5,407,280 A * | 4/1995 | Heinzl | B82Y 15/00 384/100 |
| 7,232,257 B2 * | 6/2007 | Sai | F16C 29/025 384/12 |
| 2004/0145119 A1 * | 7/2004 | Nakamura | F16C 29/025 277/409 |
| 2010/0322540 A1 | 12/2010 | Wardle | |

FOREIGN PATENT DOCUMENTS

| | | | | |
|---|---|---|---|---|
| CN | 102588435 | | 7/2012 | |
| GB | 2436600 A | * | 10/2007 | ............. F16C 32/06 |
| JP | H09-273553 | | 10/1997 | |
| JP | 10141374 A | * | 5/1998 | ............. F16C 29/025 |
| JP | 2007263327 A | * | 10/2007 | ............. F16C 32/06 |
| JP | 2009-063032 | | 3/2009 | |

OTHER PUBLICATIONS

First Office Action issued for Chinese patent application No. 201410100961.X, dated Sep. 28, 2015 (18 pages, including English translation).

Second Office Action issued for Chinese patent application No. 201410100961.X dated May 5, 2016 (6 pages, including English translation).

\* cited by examiner

ACTIVE AIRBEARING DEVICE

TECHNICAL FIELD

The present invention belongs to the field of airbearing device technologies, and in particular, relates to an active airbearing device, which can improve bearing capacity and stiffness, and achieve micron level or even sub-micron level adjustment precision at the same time.

BACKGROUND ART

A airbearing device is mainly applied to ultra-precision machining equipment, playing a role of supporting precise moving components. Relative to the traditional mechanical contact guide rail support, there is no direct contact between a airborn moving component and a support member, which avoids contact friction in a moving process, and the moving precision can be improved greatly; therefore, the airbearing device has been widely used in fields of ultra-precision machining, electronics manufacturing, precision measurement, zero-gravity simulation and the like.

A basic form of the airbearing device is as follows: after passing through a pore or slit throttling device, compressed air flows into a gap between a moving component and a support component, to form a high pressure gas film, which provides certain supporting force for the moving component. When the gap (that is, the thickness of the gas film) between the moving component and the support component decreases, the pressure of the gas film increases, the bearing capacity of the airbearing increases and the airbearing has certain stiffness. That is to say, bearing capacity and stiffness of the airbearing device form one of the key factors for the airbearing device to function in various applications.

Various method of improving the bearing capacity and the stiffness of the airbearing device have been proposed in the prior art, for example, improvements are made to structural shapes, dimensions and other aspects of an orifice and a pressure cavity of airbearing, but improvements to the bearing capacity and the stiffness of such a airbearing device in unit area, which thus restricts its applications in ultra-precision machining or high speed spindle relative to heavy load; in addition, in the prior art, active airbearing is also proposed which uses an actuating element to adjust an open section area of the orifice or the length of the orifice, but such a solution merely has a better effect of adjusting damping characteristics of the airbearing, which is still limited in the effect of adjusting supporting force and stiffness.

SUMMARY

With respect to the above defects or improvement demands in the prior art, the present invention provides an active airbearing device, wherein an active adjusting device is used to directly change the shape of gas films of airbearing, adaptive adjustment is executed for gas source pressure fluctuations at the same time, and tests indicate that dynamic stiffness characteristics of the airbearing can be improved significantly and the purpose of stabilizing the airbearing is achieved; in addition, the active airbearing device according to the present invention also has the characteristics of a compact structure, convenient operation and control, and high precision, and thus is especially suitable for occasions such as ultra-precision machining or high speed spindle which has high requirements for dynamic stiffness of support.

In order to achieve the above objective, according to one aspect of the present invention, an active airbearing device is provided, wherein the device includes a airbearing body, a gas film active adjusting unit, a support body detection unit and a drive control unit, wherein:

the airbearing body is a bearing structure internally provided with a gas channel, and is mounted with a throttler in a gas outlet of the gas channel facing a gas suspension guide rail;

the gas film active adjusting unit is in the form of a piezoelectric actuator, which is fixedly mounted to the side of the gas outlet of the airbearing body and is machined with the side to form a continuously flat surface to be jointly used as a working face of airbearing; when compressed gas flows into a gap between the working face and the gas suspension guide rail through the throttler, a gas suspension gas film is formed and the airbearing body and a moving component fixed therewith are suspended above the gas suspension guide rail;

the support body detection unit includes a position sensor, and one of a velocity sensor and an acceleration sensor, which are fixedly arranged on the airbearing body or the moving component, and are respectively used to detect in real time a position variation value and a velocity variation value or an acceleration variation value of the airbearing body relative to a supporting direction of the gas film; and the drive control unit correspondingly drives the gas film active adjusting unit connected therewith to deform according to the value measured by the support body detection unit; in this way, the overall shape of the working face of airbearing, that is, the shape of the gas suspension gas film, changes, and pressure distribution of the gas suspension gas film changes at the same time, so as to achieve a process of actively regulating dynamic stiffness of airbearing.

Further preferably, the position sensor is a laser displacement sensor or an electrical eddy current sensor, and measurement precision of the sensor is preferably set as more than 0.2 μm; the velocity sensor or the acceleration sensor is a piezoelectric vibration velocity sensor, a magneto-electric vibration velocity sensor or a piezoelectric vibration acceleration sensor, and a frequency measurement range is preferably more than 50 Hz.

Further preferably, when the airbearing body is a cylindrical bearing structure, the gas film active adjusting unit is preferably composed of a plurality of piezoelectric actuators jointly and is designed as a coaxially distributed ring body; and when the airbearing body is a rectangular bearing structure, the gas film active adjusting unit is also preferably composed of a plurality of piezoelectric actuators jointly and is designed as an array-distributed rectangular body.

Further preferably, the plurality of piezoelectric actuators complete fixing and adhesion between each other and between the piezoelectric actuators and the airbearing body through an adhesive material.

According to another aspect of the present invention, an active airbearing device is provided, wherein the device includes a airbearing body, a gas film active adjusting unit, a support body detection unit and a drive control unit, wherein:

the airbearing body is an overall I-shaped bearing structure, which is composed of an upper layer and a lower layer of disc-like structures and a middle portion coupled therebetween jointly and is internally provided with a gas channel, a gas outlet of the gas channel facing a gas suspension guide rail is disposed on a lower surface of the bearing structure to thus form a working face of airbearing, and a throttler is mounted in the gas outlet;

the gas film active adjusting unit is in the form of a piezoelectric actuator, which is fixedly mounted between the two layers of disc-like structures of the airbearing body; when compressed gas flows into a gap between the working face and the gas suspension guide rail through the throttler, a gas suspension gas film is formed and the airbearing body and a moving component fixed therewith are suspended above the gas suspension guide rail;

the support body detection unit includes a position sensor, and one of a velocity sensor and an acceleration sensor, which are fixedly arranged on the airbearing body or the moving component, and are respectively used to detect in real time a position variation value and a velocity variation value or an acceleration variation value of the airbearing body relative to a supporting direction of the gas film; and the drive control unit correspondingly drives the gas film active adjusting unit connected therewith to deform according to the value measured by the support body detection unit; in this way, the overall shape of the working face of airbearing, that is, the shape of the gas suspension gas film, changes, and pressure distribution of the gas suspension gas film changes at the same time, so as to achieve a process of actively regulating dynamic stiffness of airbearing.

Further preferably, the thickness of the disc-like structure at a lower end of the airbearing body is preferably set as 2 mm to 6 mm.

Further preferably, for the overall I-shaped bearing structure, the piezoelectric actuator is designed as a ring structure and is assembled in a manner of matching the middle portion of the bearing structure.

On the whole, by comparing the above technical solutions conceived in the present invention with the prior art, as an active adjusting device is used to directly change the shape of gas films of airbearing and setting manners of related components are designed, compared with the prior art, dynamic stiffness of airbearing can be improved more significantly, and tests indicate that both amplitude and frequency bandwidth of the dynamic stiffness can be improved significantly; in addition, adaptive adjustment is executed for gas source pressure fluctuations at the same time, and the tests indicate that dynamic stiffness characteristics of the airbearing can be improved significantly and the purpose of stabilizing the airbearing is achieved; in addition, the active airbearing device according to the present invention can also effectively suppress micro vibration of the airbearing and also has the characteristics of a compact structure, convenient operation and control, and high precision, and thus is especially suitable for occasions such as ultra-precision machining or high speed spindle which has high requirements for dynamic stiffness of support.

BRIEF DESCRIPTION OF THE DRAWINGS

In all the drawings, the same reference signs are used to represent the same elements or structures, wherein.

1—airbearing body 2—gas film active adjusting unit 3—support body detection unit 4—drive control unit 5—moving component 6—gas suspension guide rail 11—bearing structure

12—throttler 21—piezoelectric actuator 22—adhesive material 13—bearing structure 23—piezoelectric actuator

DETAILED DESCRIPTION

In order to make the objectives, technical solutions and advantages of the present invention more comprehensible, the present invention is further described below in detail with reference to the accompanying drawings and embodiments. It should be understood that specific embodiments described herein are merely used to explain the present invention instead of being used to limiting the present invention. In addition, technical features involved in various implementations of the present invention described in the following can be combined with each other as long as they do not conflict with each other.

Figure 1:
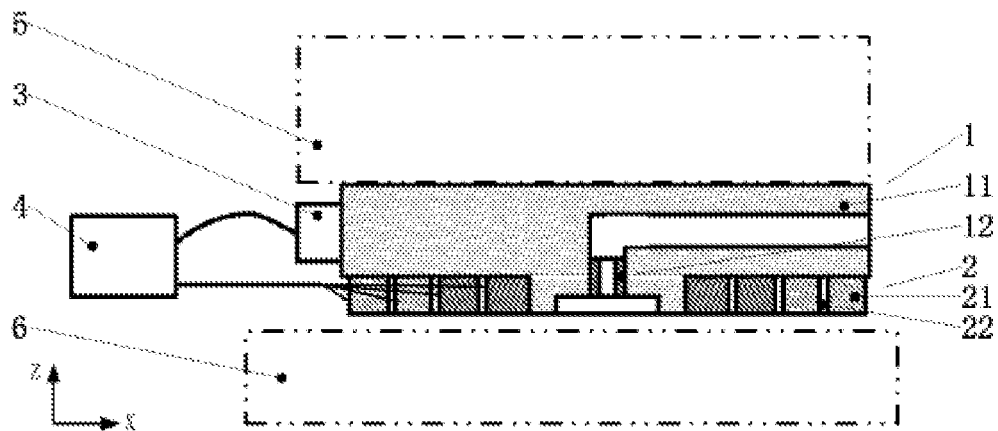
FIG. 1 is a schematic diagram of a main structure of an active airbearing device constructed according to a first preferred implementation of the present invention.

FIG. 1 is a schematic diagram of a main structure of an active airbearing device constructed according to a first preferred implementation of the present invention. As shown in FIG. 1, the active airbearing device mainly includes a airbearing body 1, a gas film active adjusting unit 2, a support body detection unit 3 and a drive control unit 4, wherein an active adjusting device is used to directly change the shape of gas films of airbearing, and adaptive adjustment is executed for gas source pressure fluctuations at the same time, so that dynamic stiffness characteristics of the airbearing are improved significantly and the purpose of stabilizing the airbearing is achieved.

Specifically, the airbearing body 1, for example, is a bearing structure 11 internally provided with a gas channel, and is mounted with a throttler 12 in a gas outlet of the gas channel facing a gas suspension guide rail 6; the gas film active adjusting unit 2 is preferably in the form of at least one piezoelectric actuator, which is fixedly mounted to the side of the gas outlet of the airbearing body 1 and is machined with the side to form a continuously flat surface to be jointly used as a working face of airbearing; wherein, preferably, the piezoelectric actuator can be fixed and adhered onto the airbearing body 1 through an adhesive material 22, which are precisely machined together to then form a continuously flat gas suspension working surface; when compressed gas flows into a gap between the working face and the gas suspension guide rail 6 through the throttler 12, a gas suspension gas film is formed and the airbearing body 1 and a moving component 5 fixed therewith, for example, a moving stage, are suspended above the gas suspension guide rail 6.

The support body detection unit 3 includes one of a position sensor, and one of a velocity sensor and an acceleration sensor, which are fixedly arranged on the airbearing body 1 or the moving component, and are respectively used to detect in real time a position variation value and a velocity variation value or an acceleration variation value of the airbearing body 1 relative to a supporting direction of the gas film, that is, the Z-axis direction shown in FIG. 1; in other words, they are used to detect variation quantity of the thickness of the gas film of airbearing. According to a preferred embodiment of the present invention, the sensors may be selected as a precise position sensor whose working specification is set as that measurement precision can reach more than 0.2 μm, and a precise velocity sensor or a precise acceleration sensor whose working specification is set as that a frequency measurement range is more than 50 Hz.

The drive control unit 4 is respectively connected with the detection device 3 and the gas film active adjusting unit 2, for example, through a wire, and the signal measured by the detection device 3 is filtered, amplified and correspondingly processed, to generate a corresponding drive signal to drive the gas film active adjusting unit 2 connected therewith to deform, for example, for the piezoelectric actuator 21, a control voltage signal is generated to make it execute an expanding or contracting action; in this way, the overall shape of the working face of airbearing, that is, the shape of the gas suspension gas film, changes, and pressure distribution of the gas suspension gas film changes at the same time, so as to achieve a process of actively regulating dynamic stiffness of airbearing. The purpose of active regulation based on a position loop is to increase stiffness of the direction of the airbearing, so as to improve anti-disturbance capability of the airbearing; and the purpose of active regulation based on a velocity loop is to increase damping of the direction of the airbearing, so as to suppress or rapidly attenuate micro vibration of the airbearing.

For the active airbearing device shown in FIG. 1, as the lower surface is the working face of the gas suspension gas film, the effect of setting multiple groups of components in the gas film active adjusting device 2 is better than that of setting a single one. Shapes and the number of specific components are related to the shape and the dimension of the airbearing. According to a preferred embodiment of the present invention, when the airbearing body 1 is a cylindrical bearing structure, the gas film active adjusting unit is preferably composed of a plurality of piezoelectric actuators jointly and is designed as a coaxially distributed ring body; and when the airbearing body 1 is a rectangular bearing structure, the gas film active adjusting unit is also preferably composed of a plurality of piezoelectric actuators jointly and is designed as an array-distributed rectangular body.

Figure 2:
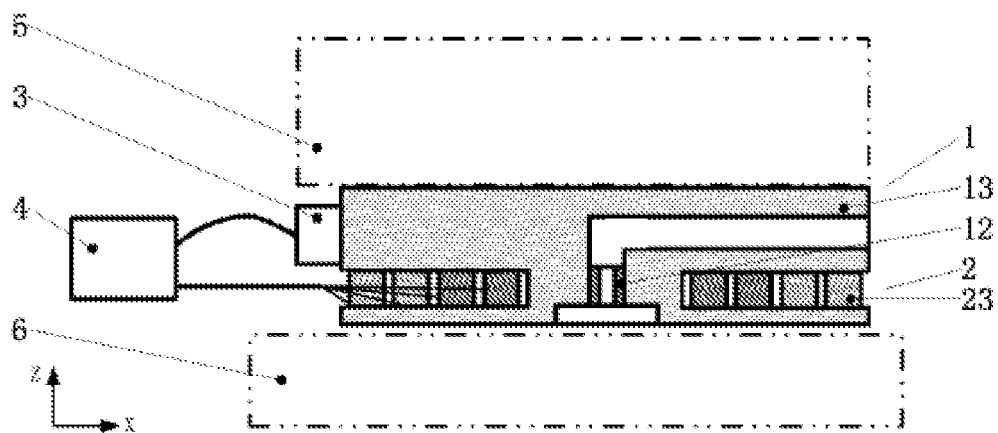
FIG. 2 is a schematic diagram of a main structure of an active airbearing device constructed according to a second preferred implementation of the present invention.

FIG. 2 is a schematic diagram of a main structure of an active airbearing device constructed according to a second preferred implementation of the present invention. As shown in FIG. 2, upon comparison, the active airbearing device is mainly different from that in FIG. 1 in that specific structures and setting manners of the airbearing body 1 and the gas film active adjusting unit 2 vary.

Specifically, in a second implementation, the airbearing body 1 is an overall substantially I-shaped bearing structure 13, which is composed of an upper layer and a lower layer of disc-like structures and a middle portion coupled therebetween jointly and is internally provided with a gas channel, a gas outlet of the gas channel facing a gas suspension guide rail is disposed on a lower surface of the bearing structure to thus form a working face of airbearing, and a throttler is mounted in the gas outlet. The gas film active adjusting unit 2 is in the form of a piezoelectric actuator 23, which is fixedly mounted between the two layers of disc-like structures of the airbearing body; when compressed gas flows into a gap between the working face and the gas suspension guide rail through the throttler, a gas suspension gas film is formed and the airbearing body and a moving component fixed therewith are suspended above the gas suspension guide rail.

During working, the piezoelectric actuator 23 of the gas film active adjusting unit 2 actively expands and contracts to squeeze the bearing structure to deform, so as to dynamically adjust the form of gas films of airbearing and achieve the effect of actively regulating dynamic stiffness of the airbearing. In order to achieve a better active regulation effect, it is necessary to reasonably design structural shapes of the piezoelectric actuator 23 in the gas film active adjusting device 2 and the bearing structure 13 in the airbearing body 1 in a matching manner. The thickness of the disc-like structure at a lower end of the bearing structure 13 should not be too large or too small, if the thickness is too large, the piezoelectric actuator 23 is required to be capable of providing a very big force to effectively regulate the form of the gas film, and if the thickness is too small, the natural vibration frequency of the bearing structure is too low and dynamic stiffness of the airbearing is limited. Therefore, in the present invention, the thickness of the disc-like structure at the lower end is preferably set as 2 mm to 6 mm, and tests indicate that a better regulation effect can be achieved.

In addition, according to a preferred embodiment of the present invention, it is feasible that the piezoelectric actuator is designed as a ring structure and is assembled in a manner of matching the middle structure of the bearing structure 13.

It will be easily understood by those skilled in the art that the above descriptions are merely preferred embodiments of the present invention but are not used to limit the present invention, and any modification, equivalent replacement, improvement and the like made within the spirit and principle of the present invention should be included in the protection scope of the present invention.

The invention claimed is:

1. An active airbearing device for supporting a precise moving component, the device comprising:
    an airbearing body;
    a gas film active adjusting unit;
    a support body detection unit; and
    a drive control unit, wherein:
        the airbearing body is a bearing structure internally provided with a gas channel, and is mounted with a throttler in a gas outlet of the gas channel facing a gas suspension guide rail;
        the gas film active adjusting unit includes a plurality of piezoelectric actuators, which are fixedly mounted to the side of the gas outlet of the airbearing body and are machined with the side of the gas outlet to form a continuously flat surface to be jointly used as a working face of the airbearing device, when compressed gas flows into a gap between the working face and the gas suspension guide rail through the throttler, a gas suspension gas film is formed, and the airbearing body and a moving component fixed therewith are suspended above the gas suspension guide rail;
        the support body detection unit comprises a position sensor having a measurement precision of more than 0.2 µm, and one of a velocity sensor and an acceleration sensor having a frequency measurement range of more than 50 Hz, the position sensor and the one of the velocity sensor and the acceleration sensor are fixedly arranged on the airbearing body or the precise moving component, and the position sensor and the one of the velocity sensor and the acceleration sensor are respectively used to detect in real time a position variation value and one of a velocity variation value and an acceleration variation value of the airbearing body relative to a supporting direction of the gas film, thereby obtaining a thickness variation value of the gas film of the airbearing device; and
        the drive control unit is respectively connected to the gas film active adjusting unit and the detection device by wire, the drive control unit is configured to filter, amplify and process a signal sensed by the detection device so as to generate a corresponding drive signal to drive the gas film active adjusting unit to execute an expanding or contracting action, thereby changing the overall shape of the working face of the airbearing device, which acts as the gas suspension gas film, and changing pressure distribution on the gas suspension gas film in the meantime so as to achieve a process of actively regulating dynamic stiffness of the airbearing device.

2. The active airbearing device according to claim 1, wherein, when the airbearing body is a cylindrical bearing structure, the gas film active adjusting unit includes a plurality of piezoelectric actuators jointly and is designed as a coaxially distributed ring body; and when the airbearing body is a rectangular bearing structure, the gas film active adjusting unit is composed of the plurality of piezoelectric actuators jointly and is designed as an array-distributed rectangular body.

3. The active airbearing device according to claim 1, wherein the plurality of piezoelectric actuators complete fixing and adhesion between each other and between the piezoelectric actuators and the airbearing body through an adhesive material.

* * * * *